(12) United States Patent
Araki

(10) Patent No.: US 11,344,793 B2
(45) Date of Patent: May 31, 2022

(54) GAME DEVICE

(71) Applicant: Takashi Araki, Tokyo (JP)

(72) Inventor: Takashi Araki, Tokyo (JP)

(*) Notice: Subject to any disclaimer, the term of this patent is extended or adjusted under 35 U.S.C. 154(b) by 0 days.

(21) Appl. No.: 17/294,493

(22) PCT Filed: Nov. 21, 2019

(86) PCT No.: PCT/JP2019/045715
§ 371 (c)(1),
(2) Date: May 17, 2021

(87) PCT Pub. No.: WO2020/110919
PCT Pub. Date: Jun. 4, 2020

(65) Prior Publication Data
US 2022/0016517 A1     Jan. 20, 2022

(30) Foreign Application Priority Data
Nov. 30, 2018   (JP) .............................. JP2018-224342

(51) Int. Cl.
*A63F 9/02*     (2006.01)
*A63F 13/20*     (2014.01)
*A63F 13/21*     (2014.01)

(52) U.S. Cl.
CPC .............. *A63F 9/0291* (2013.01); *A63F 9/02* (2013.01); *A63F 9/0252* (2013.01); *A63F 13/20* (2014.09); *A63F 13/21* (2014.09)

(58) Field of Classification Search
CPC ........ A63F 9/0291; A63F 9/02; A63F 9/0252; A63F 13/20; A63F 13/21
USPC ............................................................. 463/2
See application file for complete search history.

(56) References Cited

U.S. PATENT DOCUMENTS

| | | | |
|---|---|---|---|
| 8,795,078 B1 * | 8/2014 | Musick, Jr. ........... | G06F 3/0346 710/73 |
| 9,301,562 B1 * | 4/2016 | Chen ...................... | A63B 67/00 |
| 2013/0029764 A1 * | 1/2013 | Wang .................... | A63F 13/245 463/37 |

(Continued)

FOREIGN PATENT DOCUMENTS

| | | |
|---|---|---|
| JP | S62-120867 A | 6/1987 |
| JP | H05-034488 U | 5/1993 |

(Continued)

*Primary Examiner* — Allen Chan
(74) *Attorney, Agent, or Firm* — Paratus Law Group, PLLC

(57) ABSTRACT

To achieve a pseudo experience of launching a shuriken with improved presence feeling. A game device includes: a housing; a light source; an optical mechanism; a movement detection sensor; and a light source driver. The housing is configured to be held on a first palm of an operator. The housing includes a front protruding portion which protrudes forward and an upper surface which faces upward. The light source is housed in the housing and configured to emit light. The optical mechanism is housed in the housing and projects the light from the light source forward from a tip of the front protruding portion. The movement detection sensor detects forward movement of a second palm of the operator on the upper surface, wherein the second palm is different from the first palm. The light source driver drives the light source based on movement detection by the movement detection sensor.

8 Claims, 3 Drawing Sheets

(56) References Cited

U.S. PATENT DOCUMENTS

2013/0184085 A1    7/2013   Clark

FOREIGN PATENT DOCUMENTS

| JP | 2007-151832 A | 6/2007 |
| JP | 2011-036493 A | 2/2011 |
| JP | 2013-236765 A | 11/2013 |

* cited by examiner

[Fig. 1]
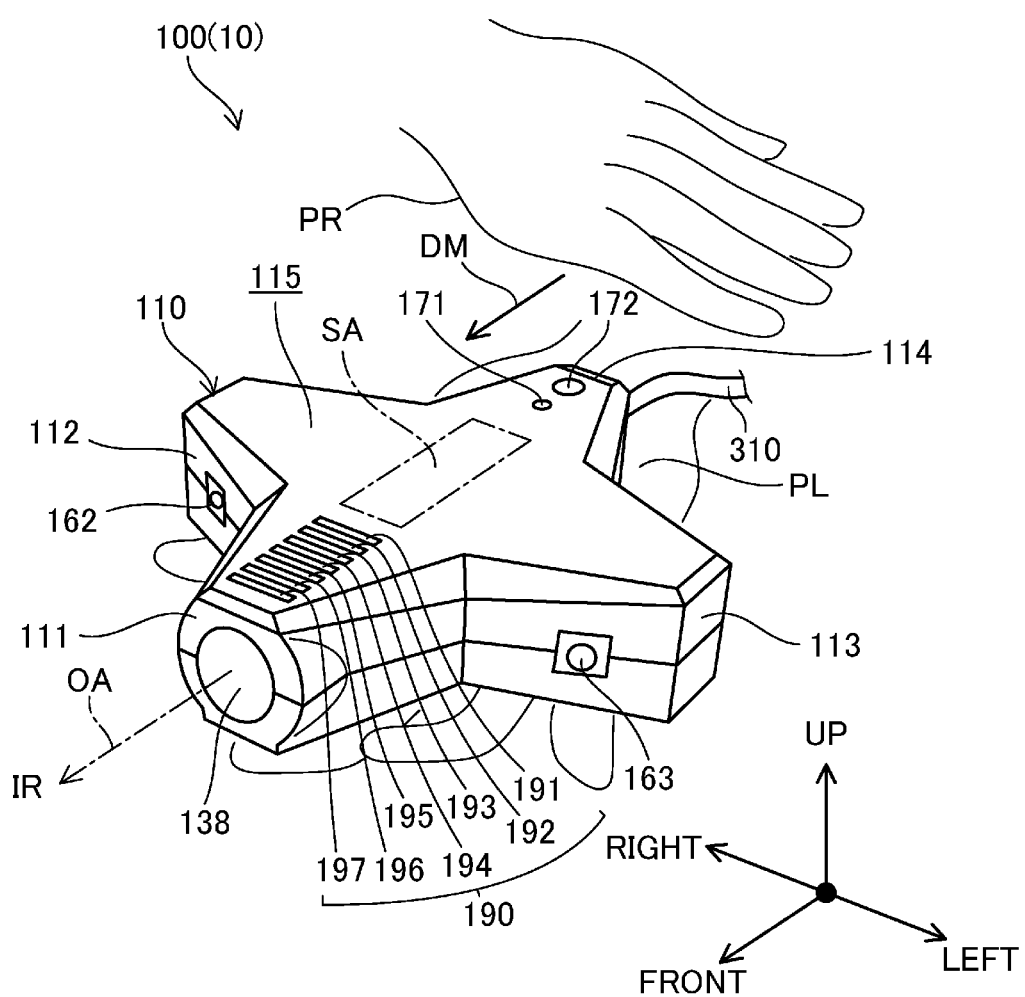

[Fig. 2]
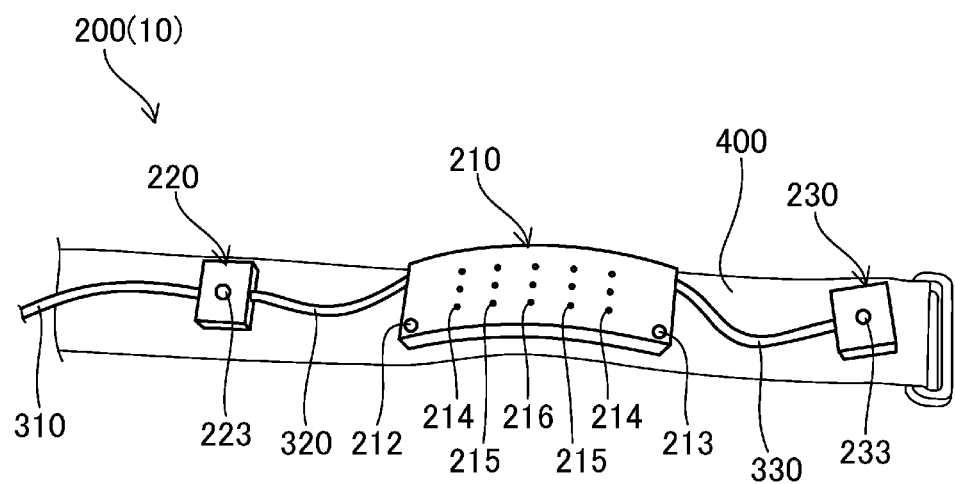

[Fig. 3]
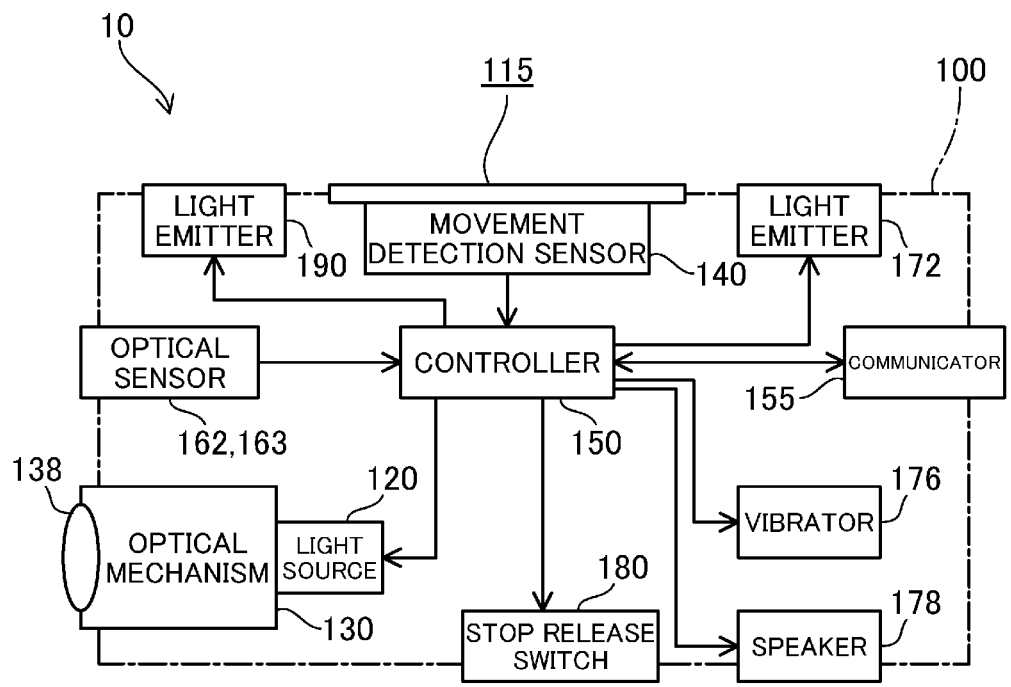

GAME DEVICE

CROSS REFERENCE TO PRIOR APPLICATION

This application is a National Stage Patent Application of PCT International Patent Application No. PCT/JP2019/045715 (filed on Nov. 21, 2019) under 35 U.S.C. § 371, which claims priority to Japanese Patent Application No. 2018-224342 (filed on Nov. 30, 2018), which are all hereby incorporated by reference in their entirety.

TECHNICAL FIELD

This description discloses a technique relating to a game device.

BACKGROUND ART

A shuriken, one type of weapon, is a small blade used by throwing with a hand (see, for example, Patent Document 1), and is often widely known as a main weapon of a ninja. As a sports competition using a shuriken, in addition to a game involving hitting a target with a shuriken, a game involving throwing shurikens to each other and so on are known. Also, as a throwing method of a shuriken, although different from an actual throwing method, a throwing method in which a shuriken placed on one palm is sent forward by the other palm is generally well known.

CITATION LIST

Patent Literature

[Patent Document] JP2011-36493A

SUMMARY OF INVENTION

Technical Problem

In sports competitions using a shuriken, since a shuriken cannot actually be thrown well depending on the throwing method in which a shuriken placed on one palm is sent forward by the other palm, it is different from the image of throwing a shuriken like a player envisions, and there was a problem that it lacked a sense of reality.

Solution to Problem

The technique disclosed in the description can be realized in the following aspects.

(1) One aspect disclosed in the description is a game device. The game device includes: a housing that is configured to be held on a first palm of an operator and includes a front protruding portion which protrudes forward and an upper surface which faces upward; a light source that is housed in the housing and configured to emit light; an optical mechanism that is housed in the housing and projects the light from the light source forward from a tip of the front protruding portion; a movement detection sensor that detects forward movement of a second palm of the operator on the upper surface, wherein the second palm is different from the first palm; and a light source driver that drives the light source based on movement detection by the movement detection sensor. According to this aspect of the game device, in response to the forward movement of the second palm on the upper surface of the housing placed on the first palm, the light can be projected in the same forward direction as the movement direction of the second palm. Therefore, by determining whether or not the light projected from the game device hits the target, a shuriken throw by the throwing method in which the shuriken placed on one palm is sent forward by the other palm can be made to experience simulated. Accordingly, it is possible to realize a simulated experience of a shuriken throwing with an improved sense of presence.

(2) In the game device of the above aspect, the housing may further include a rear protruding portion which protrudes rearward, and the movement detection sensor may be located in a region connecting the front protruding portion and the rear protruding portion on the upper surface. According to this aspect of the game device, the operator can easily aim at the direction connecting the rear protruding portion to the front protruding portion as the light projection destination.

(3) In the game device of the above aspect, the game device may further include a light emitter that is provided on a region extending over the front protruding portion on the upper surface, and emits light in response to driving of the light source. According to this aspect of the game device, It is possible to make the operator recognize that the light is projected in response to the movement of the second palm by the light emitted from the light emitter.

(4) In the game device of the above aspect, the movement detection sensor may be an electrostatic capacitance sensor provided on the upper surface. According to this aspect of the game device, the forward movement of the second palm on the upper surface can be detected based on the change in capacitance according to the distance from the second palm.

(5) In the game device of the above aspect, the game device may further include an optical sensor that detects light projected by a different game apparatus; and a detection notification part that notifies detection of the light from the different game apparatus based on light detection by the optical sensor. According to this aspect of the game device, it can be confirmed that the light projected from the different game device hits.

(6) In the game device of the above aspect, the game device may further include a pair of optical sensors that are provided at positions sandwiching the front protruding portion on the housing and detect light from the front projected by a different game apparatus; and a detection notification part that notifies detection of the light from the different game apparatus based on light detection by the pair of optical sensors. According to this aspect of the game device, it can be confirmed that the light projected from the different game device hits the housing.

(7) In the game device of the above aspect, the game device may further include an optical sensor that detects light projected by a different game apparatus; a detection notification part that notifies detection of the light from the different game apparatus based on light detection by the optical sensor; and a different housing that is different from the housing, wherein the different housing is provided with the optical sensor and the detection notification part. According to this aspect of the game device, it is possible to detect the light and notify the detection, in the different housing.

(8) In the game device of the above aspect, the game device may further include an optical sensor that detects light projected by a different game apparatus; a light emission stop part that stops light emission of the light source when the number of times of detections of the light by the optical sensor is a prescribed number of times or more; a stop notification part that notifies stop of the light emission of the light source; and a stop release part that releases the stop of the light emission of the light source by the light emission stop part. According to this aspect of the game device, it is possible to confirm the end of the game according to the number of hits to the light projected from the different game device.

The techniques disclosed herein can be realized in various aspects different from the game device. The technique disclosed herein can be realized in aspects of, for example, a game device, a part of a game device, a control method for a game device and so on.

BRIEF DESCRIPTION OF DRAWINGS

FIG. 1 is an explanatory drawing which shows the appearance configuration of a shuriken unit of a game device.

FIG. 2 is an explanatory drawing which shows the appearance configuration of a hachigane unit of the game device.

FIG. 3 is an explanatory drawing which shows the internal configuration of the shuriken unit of the game device.

DESCRIPTION OF EMBODIMENTS

FIG. 1 is an explanatory drawing which shows the appearance configuration of a shuriken unit 100 of a game device 10. FIG. 2 is an explanatory drawing which shows the appearance configuration of a hachigane unit 200 of the game device 10. The game device 10 is a device used in a shuriken throwing game to provide a simulated experience for throwing shurikens to each other. The shuriken unit 100 of the game device 10 has an appearance imitating a shuriken, which is a kind of throwing weapon. The helmet unit 200 of the game device 10 has an appearance imitating a hachigane, which is a simple helmet for protecting a forehead.

Each player in the shuriken throwing game is equipped with the game device 10. The each player holds the shuriken unit 100 on one palm PL and attaches the hachigane unit 200 to the head. In the shuriken throwing game, the player moves the other palm PR forward on an upper surface 115 of the shuriken unit 100 held on the palm PL (forward movement DM). The shuriken unit 100 projects an infrared radiation IR forward in response to the movement of the palm PR on the upper surface 115. When the shuriken unit 100 or the hachigane unit 200 of the other party detects the infrared radiation IR, the game device 10 of the other party notifies the detection of the infrared radiation IR. When the infrared radiation IR is detected a predetermined number of times (for example, three times) or more, the game device 10 stops the projection of the infrared radiation IR from the shuriken unit 100 and notifies that the stop. In this shuriken throwing game, the victory or defeat is determined by stopping the game device 10 of the other party.

As shown in FIG. 1, the shuriken unit 100 of the game device 10 includes a housing 110. The housing 110 has a front protruding portion 111, a right protruding portion 112, a left protruding portion 113, a rear protruding portion 114, and an upper surface 115.

The front protruding portion 111 of the housing 110 is a portion that protrudes forward while the shuriken unit 100 is held on the palm PL. A lens 138 that projects infrared radiation IR forward is provided at the tip of the front protruding portion 111. The optical axis OA of the infrared radiation IR faces forward.

The right protruding portion 112 of the housing 110 is a portion that protrudes toward the right side while the shuriken unit 100 is held on the palm PL. An optical sensor 162 that detects infrared radiation IR from the front by another game device 10 is provided at a position of the right protruding portion 112 facing forward.

The left protruding portion 113 of the housing 110 is a portion that protrudes toward the left side while the shuriken unit 100 is held on the palm PL. An optical sensor 163 that detects infrared radiation IR from the front by another game device 10 is provided at a position of the left protruding portion 113 facing forward. The optical sensor 163 is a pair of optical sensors provided at a position sandwiching the front protruding portion 111 together with the optical sensor 162.

The rear protruding portion 114 of the housing 110 is a portion that protrudes rearward while the shuriken unit 100 is held on the palm PL. At the tip of the rear protruding portion 114, a cable 310 for electrically connecting the shuriken unit 100 and the hachigane unit 200 is provided.

The upper surface 115 of the housing 110 is a surface facing upward while the shuriken unit 100 held on the palm PL. The upper surface 115 is formed over the front protruding portion 111, the right protruding portion 112, the left protruding portion 113, and the rear protruding portion 114. The upper surface 115 is provided with a detection region SA for detecting forward movement DM of the palm PR on the upper surface 115. The detection region SA exists at a position on the upper surface 115 that connects the front protruding portion 111 and the rear protruding portion 114.

The upper surface 115 is provided with a light emitter 171 that emits light according to the state of the game device 10. The light emitter 171 is a light emitting diode that notifies the power state of the game device 10. The light emitter 171 lights up in green when the remaining amount of electric power in the power supply of the game device 10 is sufficient. The light emitter 171 lights up in red when the remaining amount of electric power in the power supply of the game device 10 is a predetermined value or less. The light emitter 171 is turned off when there is no remaining power in the power supply of the game device 10.

The upper surface 115 is provided with a light emitter 172 that emits light according to the state of the game device 10. The light emitter 172 is a light emitting diode that notifies the operating state of the game device 10.

The upper surface 115 is provided with a light emitter 190 that emits light according to the state of the game device 10. The light emitter 190 is a lot of light emitting diodes that emits light in response to the projection of infrared radiation IR. The light emitter 190 is provided on a region extending over the front protruding portion 111 on the upper surface 115. The light emitter 190 includes a plurality of light emitters 191 to 197. The light emitters 191 to 197 are arranged side by side from the rear to the front.

As shown in FIG. 2, the hachigane unit 200 includes a housing 210, a housing 220, and a housing 230. The housings 210, 220 and 230 are other housings different from the housing 110 of the shuriken unit 100. The housing 210 form a plate shape that can be attached to the forehead of the player. The housing 220 and the housing 230 form a plate shape that can be attached to the left and right temporal regions of the player.

The housing 210 is electrically connected to the housing 220 through a cable 320. The housing 210 is electrically connected to the housing 230 through a cable 330. The housing 210 is electrically connected to the shuriken unit 100 through the cable 310 via the cable 320 and the housing 220.

The housings 210, 220 and 230 are detachably attached to the headband 400 by a hook-and-loop fastener. The headband 400 is a fixed belt configured to be wrapped around the player's head and worn.

The housing 210 of the hachigane unit 200 includes optical sensors 212 and 213, and light emitters 214, 215 and 216. The optical sensors 212 and 213 of the housing 210 detect the infrared radiation IR projected by the other game device 10. The optical sensors 212 and 213 are provided at positions sandwiching the light emitters 214, 215 and 216. The light emitters 214, 215, and 216 of the housing 210 are a plurality of light emitting diodes that notify the operating state of the game device 10. The light emitter 216 is arranged in the center of the housing 210. The light emitters 215 are provided at positions sandwiching the light emitter 216. The light emitters 214 are provided at positions sandwiching the light emitters 215 and 126.

The housing 220 of the hachigane unit 200 includes an optical sensor 223. The optical sensor 223 detects the infrared radiation IR projected by the other game device 10.

The housing 230 of the hachigane unit 200 includes an optical sensor 233. The optical sensor 233 detects the infrared radiation IR projected by the other game device 10.

FIG. 3 is an explanatory drawing which shows the internal configuration of the shuriken unit 100 of the game device 10. The shuriken unit 100 includes the optical sensors 162 and 163, the light emitters 171, 172 and 190, a light source 120, an optical mechanism 130, a movement detection sensor 140, a controller 150, a communicator 155, a vibrator 176, a speaker 178 and a stop release switch 180.

The light source 120 of the shuriken unit 100 is housed in the housing 110 and is configured to be capable of emitting light. The light source 120 is a light emitting diode that emits infrared radiation IR. The light source 120 emits infrared radiation IR based on a drive signal from the controller 150.

The optical mechanism 130 of the shuriken unit 100 is housed in the housing 110, and projects infrared radiation IR from the light source 120 from the tip of the front protruding portion 111 to the front. The optical mechanism 130 is composed of a plurality of optical devices such as the lens 138.

The movement detection sensor 140 of the shuriken unit 100 detects the forward movement DM on the upper surface 115 by the palm PR of the operator. The movement detection sensor 140 is a capacitance sensor provided at the detection area SA on the upper surface 115. In another embodiment, the movement detection sensor 140 may be a switch that detects the mechanical movement in the front-back direction accompanying the forward movement DM of the palm PR, or may be a switch that detects the mechanical vertical movement accompanying the forward movement DM of the palm PR.

The controller 150 of the shuriken unit 100 controls each portion of the game device 10. The function of the controller 150 is realized in hardware based on the circuit configuration. At least a part of the functions of each part of the controller 150 may be realized by software based on a computer program.

The controller 150 functions as a light source driver that drives the light source 120 based on the movement detection by the movement detection sensor 140. By functioning as the light source driver, the controller 150 drives the light source 120 once in response to one movement detection by the movement detection sensor 140. The controller 150 outputs a sound effect of throwing a shuriken from the speaker 178 in conjunction with driving the light source 120. The controller 150 drives the light emitter 190 in response to the drive of the light source 120. The controller 150 starts driving from the light emitter 191 located at the rear of the plurality of light emitter 191 to 197 of the light emitter 190, and then drives the light emitter 192, the light emitter 193, the light emitter 194, the light emitter 195, the light emitter 196 and the light emitter 197 in order toward the front.

The controller 150 functions as a detection notification part that notifies the detection of infrared radiation IR from another game device 10 based on the detection of infrared radiation IR by the optical sensors 162, 163, 213, 214, 223 and 233. By functioning as the detection notification part, the controller 150 drives the vibrator 176 once in response to one light detection by the optical sensors 162, 163, 213, 214, 223 and 233. The controller 150 outputs the sound effect hitting a shuriken from the speaker 178 in addition to driving the vibrator 176. By functioning as the detection notification part, the controller 150 lights up the light emitter 214 of the hachigane unit 200 in red in response to the first light detection, and lights up the light emitter 214 and 215 in red in response to the second light detection, and then lights up the light emitter 214, 215 and 216 in red in response to the third light detection.

The controller 150 functions as a light emission stop part that stops the light emission of the light source 120 when the number of detections of infrared radiation IR by the optical sensors 162, 163, 213, 214, 223 and 233 is equal to or more than a predetermined number of times (three times in this embodiment). By functioning as the light emission stop part, the controller 150 does not drive the light source 120 even if the movement detection sensor 140 detects movement when the number of detections infrared radiation IR is three or more.

The controller 150 functions as a stop notification part that notifies the light emission stop of the light source 120 by the light emission stop part. By functioning as the stop notification part, the controller 150 lights up the light emitter 172 in green when the light source 120 can emit light, and lights up the light emitter 172 in red when the light source 120 stops emitting light.

The controller 150 functions as a stop release part that releases the light emission stop of the light source 120 by the light emission stop part. By functioning as a stop release part, the controller 150 releases the light emission stop of the light source 120 by the light emission stop part based on the input signal from the stop release switch 180.

The communicator 155 of the shuriken unit 100 is configured to be able to exchange various signals with the hachigane unit 200. The communicator 155 is electrically connected to the hachigane unit 200 through the cable 310. In another embodiment, the communicator 155 may be configured to be able to exchange various signals with the hachigane unit 200 by wireless communication.

The vibrator 176 of the shuriken unit 100 is configured to be capable of generating vibration. The vibrator 176 is a vibration motor that generates vibration based on a drive signal from the controller 150.

The speaker 178 of the shuriken unit 100 is configured to be capable of generating sound. The speaker 178 generates sound based on the drive signal from the controller 150.

The stop release switch 180 of the shuriken unit 100 is a switch that receives the release of the light emission stop of the light source 120. The stop release switch 180 is a magnetic proximity switch. The game device 10 is configured to be able to cancel the light emission stop of the light source 120 by bringing a magnet close to a predetermined portion of the shuriken unit 100 provided with the stop release switch 180.

According to the game device 10 described above, in response to the forward movement DM of the palm PR on the upper surface 115 of the housing 110 placed on the palm PL, the infrared radiation IR can be projected in the same forward direction as the movement direction DM of the palm PR. Therefore, by determining whether or not the infrared radiation IR projected from the game device 10 hits the target, the shuriken throw by the throwing method in which the shuriken placed on one palm is sent forward by the other palm can be made to experience simulated. Accordingly, it is possible to realize a simulated experience of a shuriken throwing with an improved sense of presence.

Furthermore, since the movement detection sensor 140 is located in the detection region SA connecting the front protruding portion 111 and the rear protruding portion 114 on the upper surface 115, the operator can easily aim at the direction connecting the rear protruding portion 114 to the front protruding portion 111 as the light projection destination.

Furthermore, since the light emitter 190 that emits light in response to driving of the light source 120 is included, it is possible to make the operator recognize that the infrared radiation IR is projected in response to the movement of the palm PR by the light emitted from the light emitter 190.

Furthermore, since the movement detection sensor 140 is an electrostatic capacitance sensor provided on the upper surface 115, the forward movement DM of the palm PR on the upper surface 115 can be detected based on the change in capacitance according to the distance from the palm PR.

Furthermore, since it is possible to notify the detection of the infrared radiation IR by the optical sensors 162, 163, 213, 214, 223 and 233, it can be confirmed that the infrared radiation IR projected from the different game device 10 hits.

Furthermore, since it is possible to notify the detection of the infrared radiation IR by the pair of optical sensors 162 and 163, it can be confirmed that the infrared radiation IR projected from the different game device 10 hits the housing 110.

Furthermore, since the hachigane unit 200 is provided with the optical sensors 213, 214, 223 and 233 and the light emitters 214, 215 and 216, it is possible to detect the infrared radiation IR and notify the detection, in the hachigane unit 200.

Furthermore, when the infrared radiation IR is detected more than the predetermined number of times, the light emission of the light source 120 is stopped, so that it is possible to confirm the end of the game according to the number of hits to the infrared radiation IR projected from the different game device 10.

B. Other Embodiments

The technique disclosed in this description is not limited to the above-described embodiments, examples and modifications, and can be realized by various configurations without departing from the spirit thereof. For example, among the technical features in the above-described embodiments, examples and modifications, those corresponding to the technical features in each embodiment described in the column of the outline of the invention solve some or all of the above-mentioned problems. It can be replaced and combined as appropriate to, or to achieve some or all of the above effects. In addition, technical features not described as essential in this description may be deleted as appropriate.

The shuriken unit 100 may not include the optical sensors 162 and 163. The vibrator 176 may be provided in the hachigane unit 200. The cable 310 may be detachable from the shuriken unit 100. The shuriken unit 100 and the hachigane unit 200 may be configured as separate devices without connecting the shuriken unit 100 and the hachigane unit 200 with the cable 310. The shuriken unit 100 and the hachigane unit 200 may be connected to a mobile terminal device (a smartphone) via short-range wireless communication, and the shuriken unit 100 and the hachigane unit 200 may be controlled by the mobile terminal device.

The communicator 155 of the shuriken unit 100 may be configured to allow wireless communication with an external server computer. In this case, the external server computer may collect information from a plurality of shuriken units 100, such as the number of times the infrared radiation IR is projected, the number of times the IR is hit, etc., and centrally manage those information.

The game device 10 is not limited to games in which players throw shurikens at each other, but can also be applied to games in which player hit a target with a shuriken.

In order to distinguish infrared radiation IR emitted from multiple game devices, the frequency and pulse pattern of the infrared radiation IR may be set differently for each individual game device or for a group of two or more game devices.

The controller 150 may set an upper limit to the number of times to drive the light source 120. The upper limit number of times may be preset at the factory, through a portable terminal device, or through a server computer. In this embodiment, when the upper limit number of times to drive the light source 120 is reached, the controller 150 does not drive the light source 120 even if there is movement detection by the movement detection sensor 140. The controller 150 may release the stopping of light emission of the light source 120 based on the upper limit number of times based on the input signal from the stop release switch 180. The controller 150 may release the stopping of light emission of the light source 120 based on the upper limit number of times based on the detection signal from the sensor that detects the motion of swinging the shuriken unit 100. The controller 150 may release the stopping of light emission of the light source 120 based on the upper limit number of times based on a control signal from a portable terminal device or a server computer.

REFERENCE SIGNS LIST

10 . . . Game device
100 . . . Shuriken unit
110 . . . Housing
111 . . . Front protruding portion
112 . . . Right protruding portion
113 . . . Left protruding portion
114 . . . Rear protruding portion
115 . . . Upper surface
120 . . . Light source
130 . . . Optical mechanism
138 . . . Lens
140 . . . Movement detection sensor
150 . . . Controller
155 . . . Communicator
162 . . . Optical sensor
163 . . . Optical sensor
172 . . . Light emitter
176 . . . Vibrator
178 . . . Speaker
180 . . . Stop release switch
200 . . . Hachigane unit
210 . . . Housing
212 . . . Optical sensor 213 . . . Optical sensor
214 . . . Light emitter
215 . . . Light emitter
216 . . . Light emitter
220 . . . Housing
223 . . . Light emitter
230 . . . Housing
233 . . . Light emitter
310 . . . Cable
320 . . . Cable
330 . . . Cable
400 . . . Headband

The invention claimed is:

1. A game apparatus comprising:
a housing that is configured to be held on a first palm of an operator and includes a front protruding portion which protrudes forward and an upper surface which faces upward;
a light source that is housed in the housing and configured to emit light;
an optical mechanism that is housed in the housing and projects the light from the light source forward from a tip of the front protruding portion;
a movement detection sensor that detects forward movement of a second palm of the operator on the upper surface, wherein the second palm is different from the first palm; and
a light source driver that drives the light source based on movement detection by the movement detection sensor.

2. A game apparatus according to claim 1, wherein
the housing further includes a rear protruding portion which protrudes rearward, and
the movement detection sensor is located in a region connecting the front protruding portion and the rear protruding portion on the upper surface.

3. A game apparatus according to claim 1, further comprising a light emitter that is provided on a region extending over the front protruding portion on the upper surface, and emits light in response to driving of the light source.

4. A game apparatus according to claim 1, wherein the movement detection sensor is an electrostatic capacitance sensor provided on the upper surface.

5. A game apparatus according to claim 1, further comprising:
an optical sensor that detects light projected by a different game apparatus; and
a detection notification part that notifies detection of the light from the different game apparatus based on light detection by the optical sensor.

6. A game apparatus according to claim 1, further comprising:
a pair of optical sensors that are provided at positions sandwiching the front protruding portion on the housing and detect light from the front projected by a different game apparatus; and
a detection notification part that notifies detection of the light from the different game apparatus based on light detection by the pair of optical sensors.

7. A game apparatus according to claim 1, further comprising:
an optical sensor that detects light projected by a different game apparatus;
a detection notification part that notifies detection of the light from the different game apparatus based on light detection by the optical sensor; and
a different housing that is different from the housing, wherein the different housing is provided with the optical sensor and the detection notification part.

8. A game apparatus according to claim 1, further comprising:
an optical sensor that detects light projected by a different game apparatus;
a light emission stop part that stops light emission of the light source when the number of times of detections of the light by the optical sensor is a prescribed number of times or more;
a stop notification part that notifies stop of the light emission of the light source; and
a stop release part that releases the stop of the light emission of the light source by the light emission stop part.

* * * * *